Figure 1:
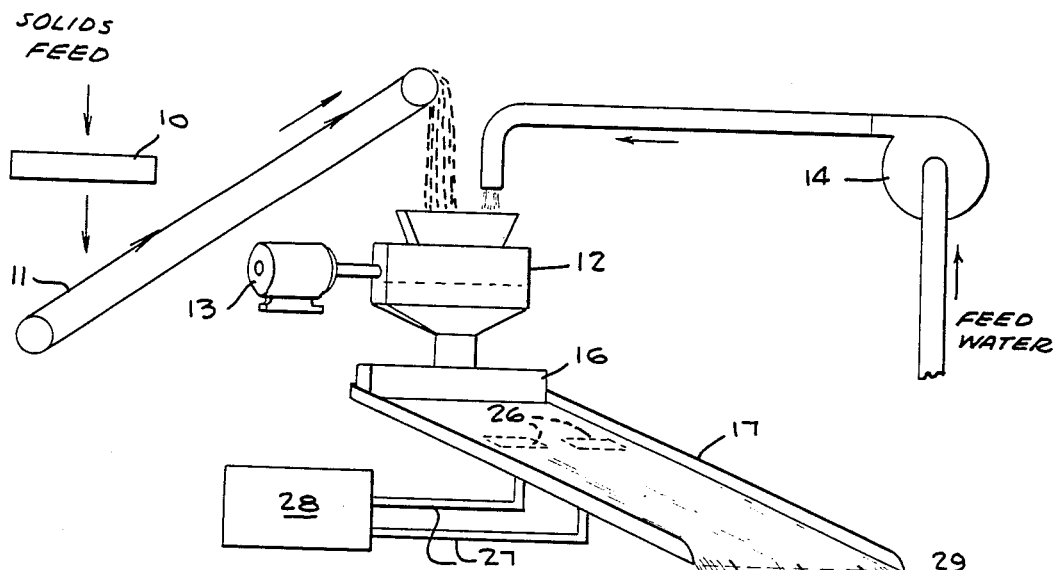

United States Patent [19]

Morton et al.

[11] Patent Number: 4,741,839
[45] Date of Patent: May 3, 1988

[54] ULTRASONIC VIBRATOR TRAY PROCESSES AND APPARATUS

[75] Inventors: William E. Morton, Bridgeport; Harold V. Fairbanks; James Wallis, both of Morgantown, all of W. Va.; Raymond L. Hunicke, Roxbury; Joseph Krenicki, Danbury, both of Conn.

[73] Assignee: Heritage Industries Inc., Bridgeport, W. Va.

[21] Appl. No.: 886,010

[22] Filed: Jul. 16, 1986

[51] Int. Cl.$^4$ .............................................. C02F 1/34
[52] U.S. Cl. ........................................ 210/748; 241/1; 134/1; 134/25.1
[58] Field of Search ................... 210/748, 767; 209/1, 209/3, 5, 173, 437; 241/1; 134/1, 25.1

[56] References Cited

U.S. PATENT DOCUMENTS

| | | | |
|---|---|---|---|
| 2,905,455 | 10/1959 | Sasaki | 209/5 |
| 4,200,470 | 4/1980 | Pennekamp | 134/25.1 |
| 4,521,302 | 6/1985 | Stone | 209/437 |
| 4,525,219 | 6/1985 | Jones | 134/1 |

OTHER PUBLICATIONS

*The Way Things Work, An Illustrated Encyclopedia of Technology*, Simon and Schuster, 1967, p. 208.

*Primary Examiner*—Richard V. Fisher
*Assistant Examiner*—Coreen Y. Lee
*Attorney, Agent, or Firm*—Mattern, Ware, Stoltz & Fressola

[57] ABSTRACT

Processes and apparatus for treatment of flowing slurries of particulate material mixed in liquid employ a wide, elongated downwardly-slanted, metal tray with upturned edge flanges, cable-suspended for unrestrained vibratory flexing and undulation. The tray is provided with a plurality of ultrasonic transducers mounted on its underside, and the flowing slurry is delivered to the upper tray end, flowing lengthwise down the tray in a shallow flowing sheet. Ultrasonic vibratory energy coupled through the tray to the flowing slurry has a "microscopic scrubbing" action on all particles and agglomerates, breaking the surface tension on the particle, cleaning particle surfaces, and separating different constituent particles and coatings of gels, slimes, algae, clay or mud. Mixtures of fine particles of coal or other valuable minerals with ash, clay, rock or sand particles are separated with unexpected efficiency by these techniques.

10 Claims, 1 Drawing Sheet

ULTRASONIC VIBRATOR TRAY PROCESSES AND APPARATUS

INTRODUCTION

This invention relates to methods and apparatus for beneficiating crushed or granulated ores, and particularly to techniques for separating valuable minerals such as coal from less valuable ash, sand, clay or fine rock fragments.

In the Appalachian coalfields, conventional coal mining operations have traditionally refined useful coal by washing from it less valuable ash, sand and clay, although fine particles of coal are often agglomerated with these ash residues produced by coal washing processes. Throughout the coalfields, so-called "gob piles" of ash residues have accumulated adjacent to coal washing yards, comprising stockpiles rich in fine particles of useful coal which have proved to be economically impractical to recover.

Various techniques have been proposed for recovering mineral fines from such crushed ores, such as the eccentric weight vibrators of U.S. Pat. Nos. 4,240,903; 4,267,046; 4,184,965; 4,039,456 and 3,997,436; the pneumo-hydraulic vibrators of U.S. Pat. Nos. 4,070,275; 4,088,716 and 4,060,481; and the Westinghouse Electric Corporation "Electrical Coagulation" techniques described in Coal Mining & Processing, September, 1982, pp 64-67. These proposals are not believed to have achieved significant commercial success.

The techniques of this invention provide unexpectedly effective and economic methods and apparatus for beneficiating such crushed or granulated ores. In the case of coal gob piles, they achieve surprisingly efficient recovery of valuable coal, while also improving the characteristics of the ash residue for densely packed back-filling of coal mining pits and excavations, and reducing the settling times for ponds and settling basins to produce clarified wash water for recycling or other uses.

These multiple advantages are achieved through a novel technique by which the crushed ore is mixed with substantially equal volumes of water to create a slurry, which is delivered in a fast-flowing shallow sheet descending along an inclined vibrator tray actuated by a plurality of ultrasonic transducers to produce standing wave patterns of ultrasonic vibrations. The vibrator tray is preferably suspended by flexible cables to maximize its flexural freedom to vibrate and undulate, and the vigorous vibratory energy thus imparted to the advancing slurry sheet produces rapid de-agglomeration and separation of ore from ash. Differing densities of the two types of particles reinforce the separation, and settling or centrifugal separators achieve nearly complete recovery of the valuable coal fines.

The same novel technique can be used to separate gold and other valuable minerals from crushed ore, with equally successful results.

Accordingly, a principal object of the present invention is to provide methods and apparatus for beneficiating crushed ore slurries on an ultrasonic vibrator tray.

Another object of the invention is to provide such methods and apparatus capable of recovering mineral particles in useful quantities from crushed ore mixtures of such minerals with ash particles in previously uneconomic forms.

A further object of the invention is to provide such methods and apparatus for recovery of such minerals as fine particles of coal from discarded tailings from the washing of coal following mining operations.

Still another object of the invention is to provide such methods and apparatus capable of separating from useful minerals the less valuable ash particles in a form exhibiting self-compacting qualities, highly useful for back-filling of mining pits and excavations.

An additional object of the invention is to provide such methods and apparatus in which fine particles of useful minerals are separated from the water slurry after treatment leaving a water-ash mixture exhibiting short settling times in ponds and settling basins, after which clarified wash water is ready for recycling or other uses.

Other objects of the invention will in part be obvious and will in part appear hereinafter.

The invention accordingly comprises the several steps and the relation of one or more of such steps with respect to each of the others, and the apparatus embodying features of construction, combinations of elements, and arrangements of parts which are adapted to effect such steps, all as exemplified in the constructions hereinafter set forth, and the scope of the invention will be indicated in the claims.

For a fuller understanding of the nature and objects of the invention, reference should be made to the following detailed description taken in connection with the accompanying drawings.

THE DRAWINGS

Figure 2:
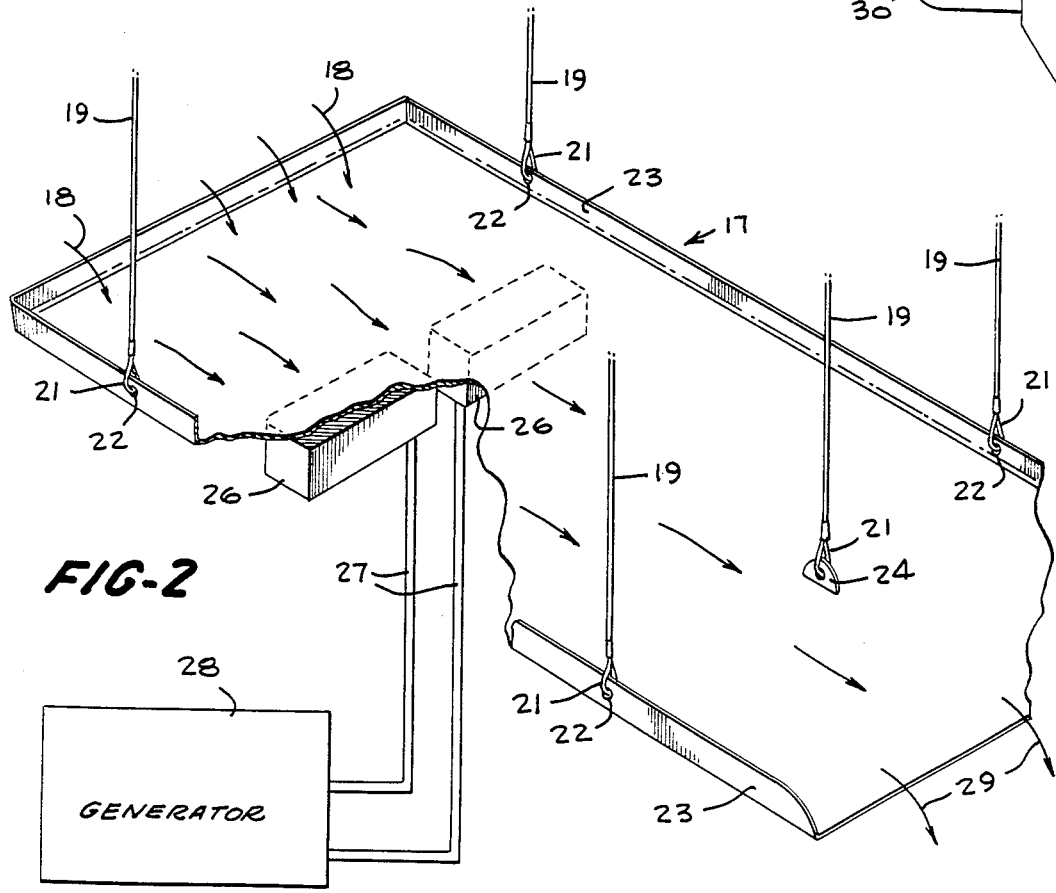

FIG. 1 is a schematic elevation view of the principal apparatus employed in the methods of the present invention, and FIG. 2 is a partially schematic front corner perspective view showing a vibrating tray employed in the methods and apparatus of the invention, partially broken away to show its construction.

BEST MODE FOR CARRYING OUT THE INVENTION

In the methods and apparatus of this invention for recovering fine mineral particles from crushed ore, a slurry is formed of feed water mixed with granulated ore solids, containing both mineral and ash constituents which are often firmly bound together by clay or water. After mixing, the slurry is delivered to a vibrator tray. The vibrator tray slopes downwardly and it is caused to vibrate by one or more ultrasonic transducers secured to its undersurface, creating vigorous standing wave patterns as the slurry travels by gravity down the slanting tray. The physical bonds between ash particles and mineral particles are broken with surprising effectiveness by the ultrasonic vibratory energy, and the slurry carrying both types of solid particles passes to a physical separation step, such as a centrifuge, where the mineral particles are efficiently separated from the slurry.

The ultrasonic standing waves created in the advancing sheet of slurry descending along the slanting tray result in de-agglomeration of the fine mineral particles from the particles of clay, ash, rock, shale or sulphur compounds, severing the bonds created by surface tension or opposite chemical charges.

After the physical bonds are severed by this ultrasonic treatment, physical separation steps for recovering the mineral particles from the slurry using such devices as a spiral, a cyclone, a table, a screen, a centrifuge, a settling tank or a screw classifier have been found to be highly effective, and the mineral particles are also found to be cleaned by the ultrasonic treatment. In the case of coal, this notably increases the number of BTUs recoverable per pound. The amounts of retained water in the recovered mineral constituent are also decreased as compared to other recovery systems, and fine pyritic sulphur constituents are decreased.

RECOVERY OF MAGNETIC PARTICLES

Similar treatment steps may be used for the recovery of magnetic material from ore, coal ash, recycled heavy media and other sources. A slurry of the feed material is passed over the ultrasonic vibrator tray for de-agglomeration and cleaning of the particles, and the slurry is then passed over a magnetic separator drum which removes the cleaned magnetic particles from the slurry.

SEDIMENTATION AND WATER CLARIFICATION

Clarification of settling pond water and increased settling rates for fines are another valuable result of the methods of the present invention. In all cases the clarification of the pond water is greatly improved and in some cases the settling rates for the fines are increased as much as ten times.

Stagnant ponds of gangue, tailings, coal and other materials often contain gelatinous material which encases the small solid particles. Ultrasound disintegrates and separates the water-gel layer from these small solid particles.

The process is as follows: the stagnant water is pumped out of the pond over the ultrasonic processing tray and it then returns into a second pond. The cleaned particles, if not colloidal, will settle to the bottom of the pond. In mineral separation, the tailings will compact quickly, and occupy less space, thereby increasing the useful life of the tailings pond.

The solid particles remaining after passing through the treatment of the present invention thus afford the advantage of a high degree of self-compaction, making the separated ash particles highly useful for back-filling of mining pits and excavations. Even when valuable mineral particles are not sought, a water slurry of fly ash tailings and other fine material, passed over the ultrasonic vibrating tray of the present invention, may be delivered directly into a settling pond, a mine shaft, an open pit or other areas where it may be needed as a fill material, and sedimentation follows more rapidly than usual. The particles react in a pozzolanic manner, i.e., they resemble compacted volcanic ash.

RECOVERY OF FINE COAL PARTICLES

The "gob piles" remaining after conventional coal washing operations may contain from 25% to 50% coal particles. After this refuse material is crushed and then screened down to ¼ inch, it is ready for treatment in the apparatus of the present invention, permitting recovery of as much as 50% of the overall gob pile as useful coal.

A preferred form of the present ore beneficiation process for the recovery of useful coal particles from gob piles is illustrated in the Figures. In FIG. 1, solid feed material is crushed and passed through a ¼ inch screen 10 and then delivered by such means as a conveyor 11 to the hopper of a mixer 12 driven by an electric motor 13. Feed water delivered by a feed water pump 14 is combined in mixer 12 with the crushed solid feed particles to form a slurry. This slurry from mixer 12 is spread laterally by a header 16, which distributes it evenly across the width of a wide, flat, elongated metal tray 17, preferably formed of stainless steel. Arrows 18 show the slurry entering the upper entrance end of the tray 17 which is positioned slanting downward along a slight incline, at an angle between 5 degrees and 15 degrees from the horizontal, for example.

As indicated in FIG. 2, tray 17 is preferably suspended by flexible cable means 19 such as twisted stainless steel cables, or twisted or braided nylon cords, having terminal eye loops 21 formed in their ends, engaging suitable support apertures 22 formed in upturned flanges 23, extending along the edges of tray 17, or in one or more upwardly extending tab flanges 24, positioned centrally between the edges of tray 17, as indicated at the right-hand side of FIG. 2.

Shown in FIG. 2 are two transducers 26 secured to the underside of tray 17. These transducers are preferably so-called "submersible" magnetostrictive transducers enclosed in sealed housings brazed to the underside of the vibrator tray and connected by pairs of conductors 27 to a suitable ultrasonic generator 28 or power supply energizing transducers 26 to deliver vibratory energy at ultrasonic frequencies to tray 17.

While a larger plurality of transducers may be employed, a pair of transducers 26 extending laterally across the major portion of the width of tray 17 at a point between about 10% and about 40% of the length of the tray, measured from the infeed entrance end where slurry 18 is introduced to the tray, toward the delivery end where similar arrows 29 show the treated slurry leaving tray 17 and descending into a hopper-conduit 30 on its way to separator 31. Operating at this intermediate position along the length of tray 17, the transducers 26 when energized, produce a shimmering vibratory wave pattern of vibrating particles which can easily be observed in the thin, shallow slurry sheet as it descends along the slanted tray. By confining the ultrasonic vibratory energy in the shallow slurry sheet, preferably from about 10 mm to about 40 mm in depth, it is not dissipated or attenuated as it would be in a deeper body of liquid.

Small agglomerated clumps of ore can be observed traveling in the flowing slurry along the downward slanted tray, bouncing and vibrating as they become progressively smaller, with the vibratory energy progressively separating the constituent particles from each other to form smaller individual particles. The unrestricted freedom of tray 17 to vibrate and flex because of its suspension on cables 19 is believed to contribute substantially to the effectiveness of the processes of the invention.

The ultrasonic vibratory energy breaks the surface tension bonds between mineral particles and ash/clay particles, and any air bubbles, gels, slimes or algae causing particles to adhere together. This process may be called microscopic scrubbing of the particles, and it produces unusually clean particle surfaces, stripped of foreign material, and carrying much less moisture than before. Bits of slime, algae or gel are thus removed from the clean surfaces of the solid particles of ash and mineral fines.

This microscopic scrubbing action is believed to account for many of the unexpected advantages of the ultrasonic vibrator tray processes. For example, with the surface tension removed, the dewatering rate and the sedimentation or settling rate for resulting fine particles are notably improved after the ultrasonic vibrator tray treatment of these slurries. This leads to rapid clarification of settling basins and pond water because of this enhanced clean separation of mineral particles from each other and from ash particles, gel, algae and the like. The rate of screening these clean fine particles is also improved following this ultrasonic vibrator tray treatment of such slurries, and clogging buildups of fines on screens is greatly reduced when the fine particle surfaces are cleaned in this manner.

Self compaction of these ultrasonic scrubbed fine particles, unimpeded by air bubbles, gel particles or other foreign coatings, leads to denser filter cakes or sludge layers. It will be understood that the rates of screening, filtration, conveying, heat transfer and drying of the resulting scrubbed fine particles are all enhanced by these processes of the invention and the effective extraction rates of percentages of recovery of fine coal particles, heavy metal particles or precious metal particles from crushed ore slurries are significantly improved. Leaching rates and removal of sulphur in pyrite form from fine coal particles are also improved.

Chemical additives such as flocculating agents are made significantly more efficient by these processes. For example, when they are used with the processes of this invention, the normal amounts of flocculants may be reduced by as much as 80% to 95% without adversely affecting the operating results.

Finally, subsequent operations such as centrifugal separation steps are made more efficient when they are performed on the slurries treated in the ultrasonic vibrator tray processes of this invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The process of treating with vibratory energy a flowable slurry of particulate materials mixed in a liquid for de-agglomeration and cleaning of the particulate material, comprising the steps of
   providing a laterally extended and downwardly elongated treatment zone bounded by an adjoining flat boundary surface,
   delivering the slurry in a thin laterally extended layer to an upper entrance end of said laterally extended and downwardly elongated treatment zone,
   coupling vibratory energy through said boundary surface to cause the slurry to vibrate in a direction substantially perpendicular to its length and to its width at a frequency between about 10 kHz and about 50 kHz for de-agglomeration and cleaning of the particulate material, while the slurry flows downward through the downwardly elongated treatment zone toward a lower exit end thereof,
   and thereafter conducting the treated slurry to a separation zone where the particulate materials are separated from the liquid.

2. The process defined in claim 1 wherein the treatment zone is downwardly elongated in a slanting diagonal direction relative to the vertical, and the boundary surface underlies the treatment zone.

3. The process defined in claim 2 wherein the slanting treatment zone descends at an angle between about 5 degrees and about 25 degrees from the horizontal.

4. The process defined in claim 1 wherein all of the steps are performed simultaneously and continuously, whereby a continuous slurry treatment is achieved in the treatment zone.

5. The process defined in claim 1 wherein the particulate materials include mineral fines.

6. The process defined in claim 1 wherein the particulate materials include mineral fines and ash particles.

7. The process defined in claim 6 wherein the mineral fines are fine coal particles.

8. The process defined in claim 1 wherein the liquid is water.

9. The process defined in claim 7 wherein the particulate materials also include clay particles.

10. The process defined in claim 1 further comprising the step of supporting said adjoining flat boundary surface for free vibratory and undulatory flexing movement.

* * * * *